L. H. DEANER.
ADVERTISING SIGN.
APPLICATION FILED OCT. 18, 1907.
910,650.
Patented Jan. 26, 1909
2 SHEETS—SHEET 1.
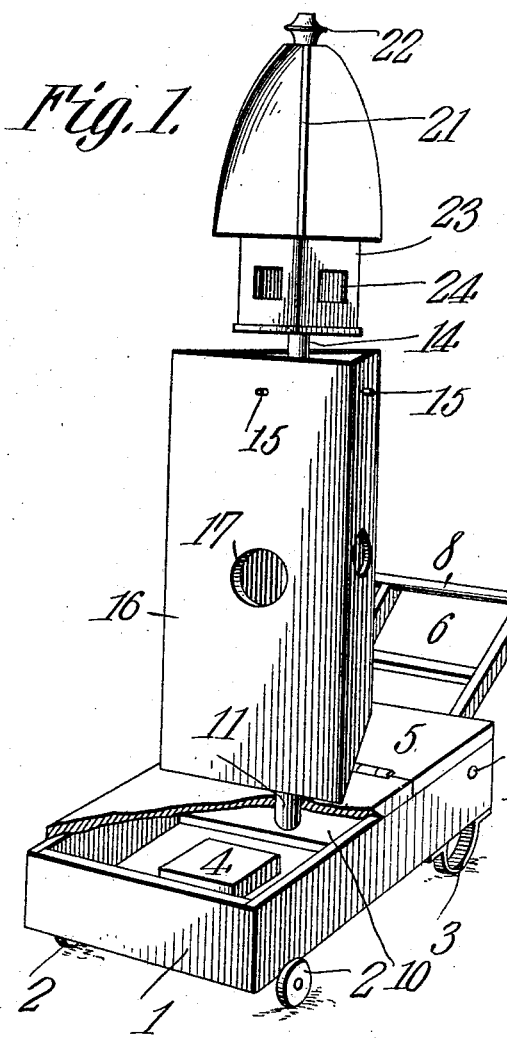
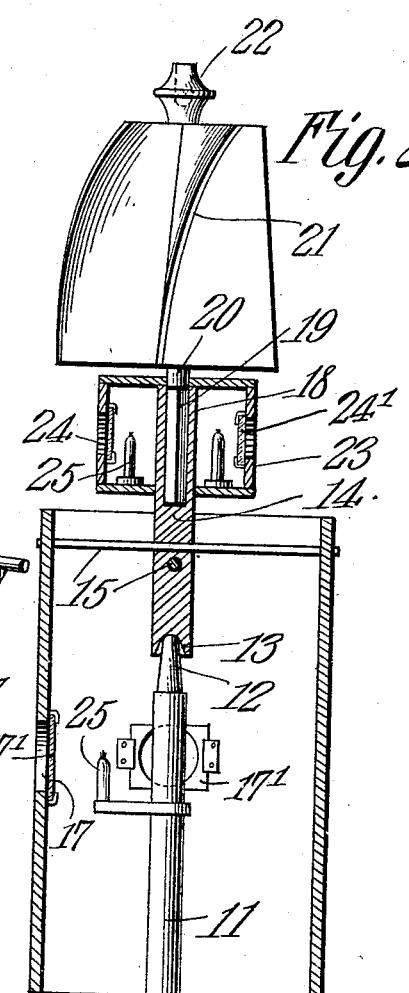
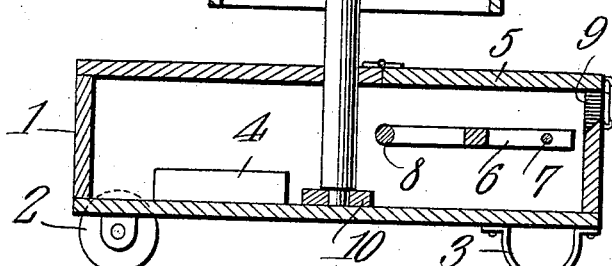
Witnesses
Lee H. Deaner
Inventor
By C. A. Snow & Co
Attorneys
THE NORRIS PETERS CO., WASHINGTON, D. C.

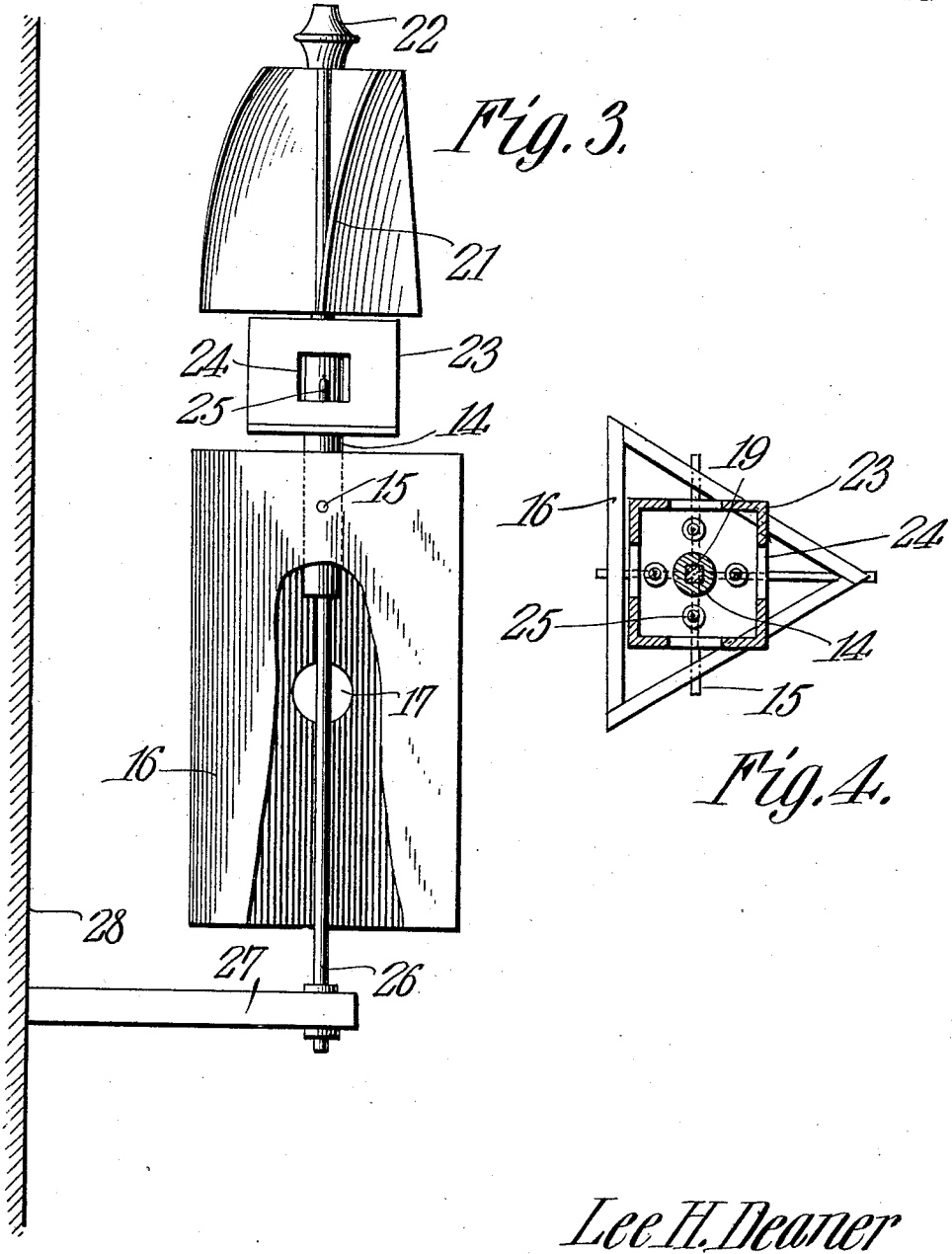

UNITED STATES PATENT OFFICE.

LEE HARMAN DEANER, OF MUSKEGON, MICHIGAN, ASSIGNOR OF ONE-THIRD TO JOSEPH MICHAEL HERBERT, OF MUSKEGON, MICHIGAN.

ADVERTISING-SIGN.

No. 910,650.  Specification of Letters Patent.  Patented Jan. 26, 1909.

Application filed October 18, 1907. Serial No. 398,099.

*To all whom it may concern:*

Be it known that I, LEE HARMAN DEANER, a citizen of the United States, residing at Muskegon, in the county of Muskegon and State of Michigan, have invented a new and useful Advertising-Sign, of which the following is a specification.

This invention has reference to improvements in advertising signs, and is designed primarily to provide a sign support which may be easily moved from place to place and which by a combination of movements under the action of wind will arrest the attention of persons passing by the sign and so induce them to read the advertising matter.

The invention comprises essentially a rotatable body preferably triangular in cross section but which may be of any other desired shape, having a pivotal support near its upper end so constructed as to permit the advertisement carrier not only to rotate but to swing from side to side as it rotates, thus giving a compound movement designed to arrest the attention of passers-by. In order that the device may be rotated it is surmounted by a wind wheel which when the air is in movement is rotated by said air and this motion is communicated to the advertisement carrier. The wind wheel is placed at a sufficient distance above the pivot support of the advertisement carrier to act upon the latter in such a manner as not only to cause it to rotate but to swing in various directions about the pivot support. Furthermore, provision is made for the inclusion in the device of light-giving elements so that the advertising device becomes prominent at night and passers-by are constrained to stop and view the device and are thus induced to read the advertisements carried thereby.

The invention also comprises a supporting means for the advertisement carrier in the form of a truck which may have wheels at one end and supports at the other overcoming any tendency of the wheels to permit the truck to move on said wheels when subjected to the influence of wind, while the truck is also weighted to make it sufficiently heavy to resist overturning by the wind, and handles are provided for moving the truck from place to place, said handles being pivotally mounted in such manner as to fold within the body of the truck and thus be hidden from view when not in use.

The invention will be best understood by reference to the following detailed description, taken in connection with the accompanying drawings forming part of this specification, in which,—

Figure 1 is a perspective view of the device in portable shape; Fig. 2 is a central vertical section through the same, with parts in elevation; Fig. 3 is a side elevation, with parts broken away, showing the device supported from the side of a building, and of a non-portable type; and Fig. 4 is a cross section through the light-giving element looking down upon the advertisement carrier.

Referring to the drawings, and more particularly to Figs. 1 and 2, there is shown a support 1 in the form of a rectangular box mounted at one end upon wheels 2 and at the other end upon legs 3 formed of curved straps having their ends secured to the under side of the support 1. Within the box-like support 1 there is a counterweight 4 which may be sufficiently heavy to prevent the structure from being overturned by air currents of even considerable velocity. One end of the box or support 1 may be provided with a hinged cover 5 so that the interior of the box may be readily reached, and inside of the box is located a frame 6 pivoted at one end upon a cross rod 7 and at the other end provided with a handle bar 8. This frame is movable about the rod 7 as a horizontal axis and it may be turned about the said rod until the handle 8 is in the position shown in Fig. 1 so as to be accessible, in which position the side members of the frame 6 rest in notches 9 formed in the ends of the box or support 1. When in this last-named position the cover 5 may be returned to place and fastened by a suitable hook so that the corresponding end of the box or support 1 may be lifted to raise the feet 3 from the ground and the box may be moved from place to place upon the rollers 2.

Stepped at its lower end in a cross bar 10 on the bottom of the box and extending upward through the top of the box is a post 11 terminating at the upper end in a point 12 entering a socket 13 formed in the lower end of an upright bar 14 through which extend cross rods 15 entering the upper end of a triangular body 16 and thus carrying the latter. The triangular body 16 constitutes the advertisement carrier of the device and extends downward from its supporting rods 15 to near the top of the body of the support 1.

The ends of the body 16 are open and the sides may be provided with perforations 17, either for the display of lights at night or for any other purpose which would tend to attract attention.

The bar 14 is continued upward above the top of the body 16 and is there provided with a non-circular socket 18 receiving the correspondingly shaped end 19 of a stem 20 carrying a number of vanes 21 and terminating in an ornamental head 22 which may, if desired, also be socketed as indicated in dotted lines for the reception of the staff of a flag, or banner, or like device. The vanes 21 may be made in the shape shown or in any other shape which will tend to so catch the wind as to cause the wind wheel vanes to rotate upon a vertical axis. When the wind strikes the vanes and thereby imparts to them a movement of rotation upon a vertical axis the bar 14 participates in such rotative movement because of the non-circular end 19 entering the socket 18, whereby the wind wheel device and the bar 14 are united for synchronous movement. When the wind wheel is rotated by the movement of the air the advertisement carrier 16 also participates in this rotative movement. However, the pivotal support for the advertisement carrier 16 is considerably below the wind wheel and, in fact, may be about midway of the distance between the top of the wind wheel and the bottom of the advertisement carrier 16. Because of this location of the pivotal support the wind striking the wind wheel will tend to rock the entire structure about the pivot 12 as well as imparting a movement of rotation upon a vertical axis, for the wind strikes the wind-wheel or carrier or both at substantially right angles to the vertical axis of these parts and the surfaces presented to the wind above and below the pivot 12 are actually or effectively unequal. The result of this is that the advertisement carrier passes through a devious path, the resultant of the motions of rotation about a vertical axis and oscillation about a horizontal axis, and because of the various wind currents the motion of the advertisement carrier is quite erratic and apparently aimless, thus tending to attract the notice of passers-by who stopping to watch the peculiar motions of the advertisement carrier are thereby induced to read any legends which may be placed upon said carrier, whereby the purpose of the device as an advertising medium is accomplished.

Upon the bar 14 between the body 16 and the wind wheel there is a casing 23 which may be rectangular in cross section as shown, or any other desired shape, with upright walls each provided with a perforation 24. This casing 23 is designed to rotate with the bar 14 and to carry light-giving elements 25 behind the openings 24, which latter may, if desired, be covered with colored glass or other transparent plate 24', or plain, clear glass may be used.

While I have shown a pin-and-socket support about which the advertisement carrier may move, it will, of course, be understood that other supporting means may be employed at this point.

In Fig. 3 the advertisement carrier with the wind wheel and light chamber are shown supported upon a rod 26 taking the place of the post 11, and this rod is fixed to the outer end of a beam 27 projecting from the side wall 28 of a building. In this construction the advertisement carrier is not portable as in the form shown in Figs. 1 and 2, but being supported by the building and at a point preferably above the doorway of a store, it is not necessary that the device be portable, and if the chamber 23 be located adjacent to a window the light-giving elements 25 may be renewed from time to time without the necessity of lifting the device from the rod support 26.

I have shown the advertisement carrier or body 16 as triangular for illustrative purposes only, and the invention is not confined to a body of triangular shape, and while I have shown the openings 17 as round and the openings 24 as square, these openings may be any desired shape other than that shown, and these openings may be covered with either colored or clear glass such as indicated at 17' and 24' in Fig. 2, and upon such glass coverings advertising matter may be displayed, so that the advertisements are rendered visible at night and may be of such character as to be also visible by day, although the daylight advertising matter will be displayed upon the plain surfaces of the body 16 and, if desired, upon the casing 23 and vanes 21 as well as upon the box 1. In addition to the light-giving elements 25 similar light-giving elements may be used at night behind the openings 17.

Regarding the structural features of the device, it may be made of wood or metal, or the box 1 may be made of wood while the advertisement carrier 16, casing 23, and vanes 21 may be made of metal, say, sheet zinc suitably painted to withstand the weather. Furthermore, the design of the device may be varied from that shown and ornamental painting may be placed upon the exposed portions as the esthetic tastes of the manufacturer may dictate.

The invention is not limited to exact structures or exact location of parts shown but in many instances these parts may be differently constructed or arranged or interchanged so long as there is no departure from the invention as set forth in the appended claims.

I claim:—

1. An advertising stand comprising an advertisement carrier supported pendently from a point near its upper end and responsive to substantially horizontal air currents to swing pendulously, and means on said carrier responsive to substantially horizontal air currents and imparting, when actuated by such air currents rotattive movement to the carrier on a vertical axis.

2. An advertising stand comprising an advertisement carrier supported pendently from a point near its upper end and capable of rotative movement on a vertical axis and also of movement on a horizontal axis, and a wind wheel responsive to substantially horizontal air currents and connected to the advertisement carrier at a point above its pivotal support.

3. An advertising stand comprising a pivotal support, an advertisement carrier consisting of a hollow body engaging said pivotal support at a point near the upper end of said body and capable of moving about said support on both vertical and horizontal axes, and a wind wheel above said body and connected thereto and participating in the movements of said body about its pivotal support, said wind-wheel being responsive to substantially horizontal air currents.

4. An advertising stand comprising an advertisement carrier supported pendently from a point near its upper end and capable of rotative movement on a vertical axis and also of movement on a horizontal axis, a wind wheel responsive to substantially horizontal air currents connected to the advertisement carrier at a point above its pivotal support, and means for carrying light-giving units also attached to said advertisement carrier body, and participating in its movements about its pivotal support.

5. An advertising stand consisting of a pivotal support, a hollow body comprising an advertisement carrier mounted on said support near the upper end of said body for movement on both vertical and horizontal axes, a casing for inclosing light-giving units carried by said body above the pivotal support, and a wind wheel also carried by said body above the casing for the light units.

6. An advertising stand comprising a pivotal support, a central socketed member mounted on said support and capable of moving about the same on both vertical and horizontal axes, a hollow advertisement carrier body provided with perforations for the passage of light, said body being fixed to said socketed member to hang below the socket thereof, a perforated casing for the reception of light units carried by said socketed member above the advertisement carrier, and a wind wheel carried by said socketed member above said casing and participating in the movements of said socketed member.

7. An advertising sign comprising a base or support having rollers at one end and supporting members at the other end, a counterweight in said base, a stem mounted on said base or support, and an advertisement carrier on said stem.

8. An advertising stand comprising a hollow base or support, wheels at one end of said base or support, fixed legs at the other end thereof, a pivotal handle normally housed within said base and movable out of the same around the pivot into operative position, a stem carried by said base or support, and an advertisement carrier on said stem.

9. An advertising stand comprising a hollow base or support provided with a cover and with notches at one end, a counterweight within said base or support, a pivoted handle normally housed in said base or support beneath the cover and movable about its pivot to an operative position exterior to said base or support and engaging in the notches therein, a stem carried by said base or support, and an advertisement carrier mounted on said stem.

In testimony that I claim the foregoing as my own, I have hereto affixed my signature in the presence of two witnesses.

LEE HARMAN DEANER.

Witnesses:
JOSEF M. HERBERT,
JOHN W. WILSON.